US010061485B2

(12) United States Patent
Ikejima et al.

(10) Patent No.: US 10,061,485 B2
(45) Date of Patent: Aug. 28, 2018

(54) INFORMATION PROCESSING SYSTEM THAT ORGANIZES AND CLEARLY PRESENTS MASS DATA TO USER, INFORMATION PROCESSING METHODS, AND RECORDING MEDIUM

(71) Applicant: KYOCERA Document Solutions Inc., Osaka (JP)

(72) Inventors: Ayaka Ikejima, Osaka (JP); Akira Yuki, Osaka (JP); Wataru Endo, Osaka (JP); Masato Tanba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 410 days.

(21) Appl. No.: 14/792,078

(22) Filed: Jul. 6, 2015

(65) Prior Publication Data
US 2016/0012154 A1    Jan. 14, 2016

(30) Foreign Application Priority Data

Jul. 8, 2014  (JP) .................................. 2014-140115

(51) Int. Cl.
*G06F 17/00*    (2006.01)
*G06F 17/30*    (2006.01)
(Continued)

(52) U.S. Cl.
CPC .......... *G06F 3/0484* (2013.01); *G06T 11/206* (2013.01)

(58) Field of Classification Search
CPC .............................. G06F 3/0484; G06F 11/206
See application file for complete search history.

(56) References Cited

U.S. PATENT DOCUMENTS 5,664,077 A * 9/1997 Kubo ...................... G06T 17/00
345/419
7,812,826 B2 * 10/2010 Ording ................ G06F 3/04845
345/156
(Continued)

FOREIGN PATENT DOCUMENTS

JP    2009-066088         4/2009
JP    2009-066088 A       4/2009
(Continued)

OTHER PUBLICATIONS

Josef Cermak, "Algorithm Graph Plotter", Department of Physics, University of Chemical Technology, Jul. 1971, Communications of the ACM: vol. 14 Issue 7, pp. 492 and 493.*

(Continued)

*Primary Examiner* — Cheryl Lewis
(74) *Attorney, Agent, or Firm* — Stein IP, LLC (57) ABSTRACT

An information processing system includes an information processing device, a display apparatus, and an operation detecting device. The control circuit allocates (N−1) or more mutually different attributes to respective axes of a (N−1)-dimensional space, generates a graph plotting the plurality pieces of stored data on the (N−1)-dimensional space as respective points corresponding to the plurality pieces of data, classifies the plurality pieces of plotted data into groups using another one attribute other than the (N−1) or more attributes; and processes the plurality of points so as to be identified by the group. The display apparatus displays the graph processed by the control circuit. The operation detecting device detects an action performed by a user. The control circuit moves, rotates, zooms in, and zooms out the graph displayed on the display apparatus depending on the user's action detected by the operation detecting device.

8 Claims, 10 Drawing Sheets

(51) Int. Cl.
G06F 3/0484 (2013.01)
G06T 11/20 (2006.01)

(56) References Cited

U.S. PATENT DOCUMENTS

| 8,200,808 | B2 | 6/2012 | Ishida | 709/224 |
| 2002/0026247 | A1* | 2/2002 | Ikami | G06T 11/206 |
| | | | | 700/1 |
| 2013/0332890 | A1* | 12/2013 | Ramic | G06F 3/04815 |
| | | | | 715/852 |
| 2014/0015794 | A1* | 1/2014 | Ueno | G06F 3/04883 |
| | | | | 345/174 |

FOREIGN PATENT DOCUMENTS

| JP | 2010-079872 | 4/2010 |
| JP | 2010-079872 A | 4/2010 |
| JP | 2012-8635 A | 1/2012 |
| JP | 2012-173846 A | 9/2012 |
| JP | 2012-208705 | 10/2012 |
| JP | 2012-208705 A | 10/2012 |

OTHER PUBLICATIONS

Ivan Herman, Guy Melancon, and M. Scott Marshall, "Graph Visualization and Navigation in Information Visualization: A Survey", IEEE Transactions on Visualization and Computer Graphics, vol. 6, No. 1, Jan.-Mar. 2000, pp. 24-43.*

* cited by examiner

INFORMATION PROCESSING SYSTEM THAT ORGANIZES AND CLEARLY PRESENTS MASS DATA TO USER, INFORMATION PROCESSING METHODS, AND RECORDING MEDIUM

INCORPORATION BY REFERENCE

This application is based upon, and claims the benefit of priority from, corresponding Japanese Patent Application No. 2014-140115 filed in the Japan Patent Office on Jul. 8, 2014, the entire contents of which are incorporated herein by reference.

BACKGROUND

Unless otherwise indicated herein, the description in this section is not prior art to the claims in this application and is not admitted to be prior art by inclusion in this section.

Recently, use of an input device such as a motion capture device, which an input from a user in three dimensions can be recognized, and an output device such as an air display or a Head Mount Display (HMD), which is capable of image output in three dimensions, has been ensuring implementation of a Natural User Interface (NUI) that can perform a natural and intuitive communication between a computer and a user.

The technique that organizes and clearly presents a large amount of data stored in an information processing device to a user has been developed.

For example, a technique provides that time-series data are displayed while automatically switching a time scale based on a record in which time scale the data are browsed in the past such that the user readily understands the mass data displayed in chronological order in a screen.

For example, the other technology provides that a mobile phone terminal extracts a communication pattern based on communication log information of the terminal itself and correlates the extracted communication pattern with each day of a calendar to display visually and more intelligibly. In this technique, statistical processing for the communication log information and a presentation of communication traffic per unit period in a line graph are also performed.

For example, the other technology additionally provides per-thread management of a large number of e-mails sent and received using an image forming apparatus.

SUMMARY

An information processing system according to an aspect of the disclosure includes an information processing device, a display apparatus, and an operation detecting device. The information processing device includes a storage circuit that stores a plurality of pieces of data having N (N is an integer equal to or greater than three) types of attributes, and a control circuit. The control circuit allocates (N−1) or more mutually different attributes to respective axes of a (N−1)-dimensional space, generates a graph plotting the plurality pieces of stored data on the (N−1)-dimensional space as respective points corresponding to the plurality pieces of data, classifies the plurality pieces of plotted data into groups using another one attribute other than the (N−1) or more attributes; and processes the plurality of points so as to be identified by the group. The display apparatus displays the graph processed by the control circuit. The operation detecting device detects an action performed by a user. The control circuit moves, rotates, zooms in, and zooms out the graph displayed on the display apparatus depending on the user's action detected by the operation detecting device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings.

Point of the Disclosure

First, intention of the disclosure will now be described. A first point of the disclosure is to gather a large amount of data by a manageable unit such that a user easily operates with a NUI. In the following description, a unit for easier handling of the large amount of data is referred to as "stream."

For example, assume that the large amount of data is for a large number of e-mails in the past stored in an information processing device by a user.

In this case, the data of the large number of e-mails can be plotted one by one on a three-dimensional graph. Plotting points of data alone results in the creation of a scatter diagram, which causes the user has difficulty in distinguishing the large number of points to recognize. Therefore, the data of the e-mail are linked with a curved line per thread (by group) based on a subject of the mail to represent as the stream, so as to clearly presents the large amount of data to the user.

The curved line by stream is employed here. However, it is not limited to the above configuration, and any representation that shows distinguishably with classifying the points plotted by group by coloring may be applicable.

Figure 1:
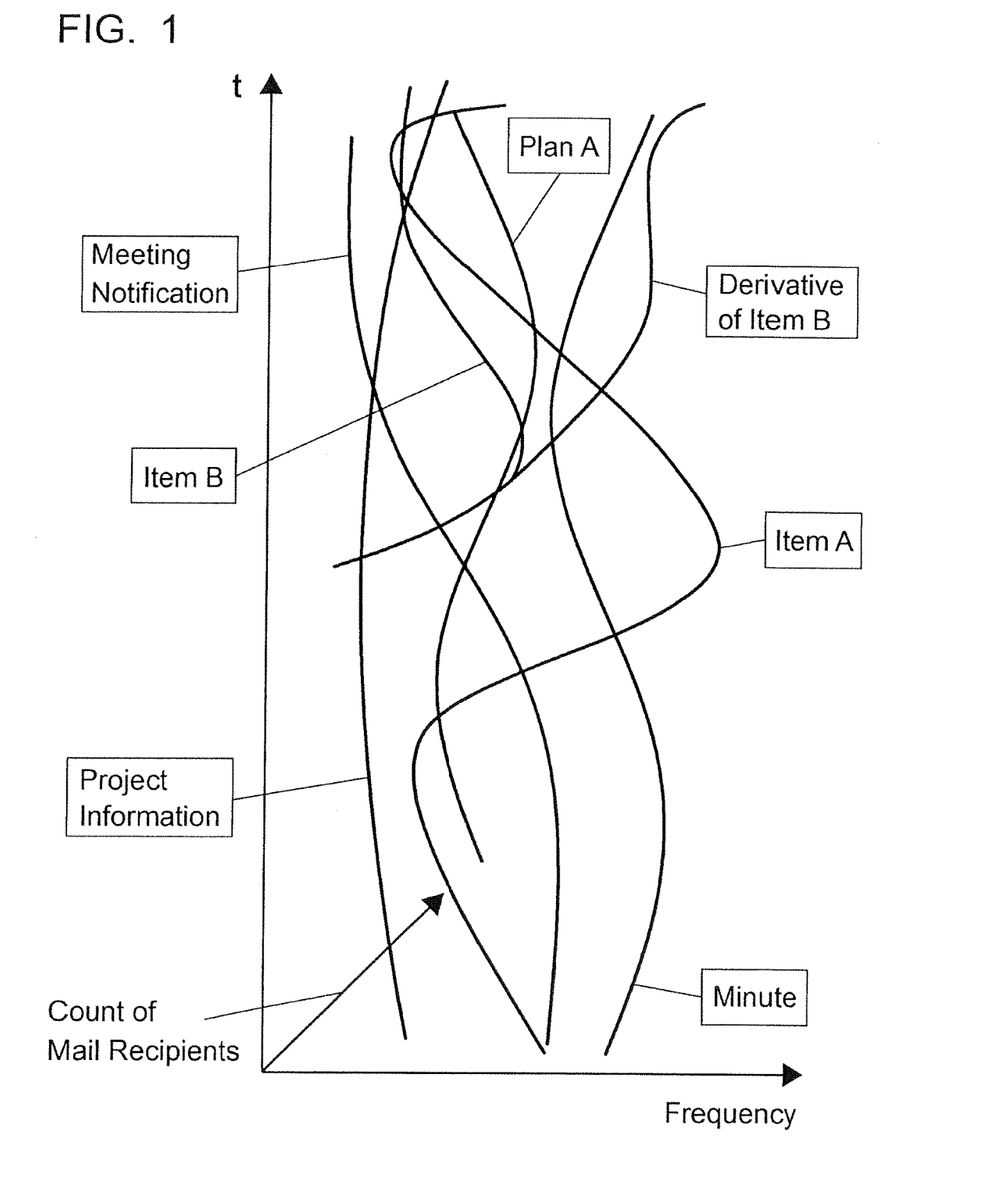
FIG. 1 illustrates a graph of plotting on a three-dimensional graph with time of sending and receiving (t), frequency of sending and receiving, and a count of mail recipients along three axes where data of a large number of e-mails are linked with a curved line per thread based on a subject of the mail to represent a stream.

FIG. 1 illustrates a graph of plotting on the three-dimensional graph with time of sending and receiving (t), frequency of sending and receiving, and a count of mail recipients along three axes where data of the large number of e-mails are linked with the curved line per-thread based on the subject of the mail to represent the stream.

As can be seen from the name of the stream, one axis among three axes may represent the time related to processing data such that the data are lined up in a row over time. An information processing device according to the disclosure can find an attribute capable of lining up the data in a row on the graph among the various attributes of the data by a data analysis. Thus, plotting the data such as in chronological order so as to be lined up in a row causes the user easily determine the change in chronological order.

The curved lines of respective streams in the graph may be represented by mutually different colors or line styles so as to be distinguished.

Here, for example, the count of e-mails that have the identical subject and are sent and received within a specified time period before and after the time of sending and receiving of the e-mail may be employed as the frequency of sending and receiving per one specific e-mail.

Plotting on the three-dimensional graph with the above-described three attributes of each e-mail, and then associating the relevant data with each other based on the title of the e-mail and linking with the curved line to represent as the stream causes the user distinguish the large amount of data visually and easily to determine.

In the above description, a concrete example is provided to make a graph in three-dimensional space along the axes for three attributes of each of the large amount of data and additionally classify using another attribute to form the stream.

Typically, it is possible to make a graph of the large amount of data, of which each data has N (N is an integer equal to or greater than three) types of attributes, in (N−1)-dimensional space to classify the large amount of data plotted on the graph using another one attribute. The N (N is an integer equal to or greater than three) types of attributes may be times of sending and receiving e-mails, a frequency of sending and receiving e-mails per unit time, and a recipient of the e-mail, and another one attribute may be a title of the e-mail.

A second point of the disclosure is to represent the large amount of data gathered by stream for the NUI graphically and ensures searching for the data which the user desires to retrieve based on even fuzzy search criteria.

Figure 2:
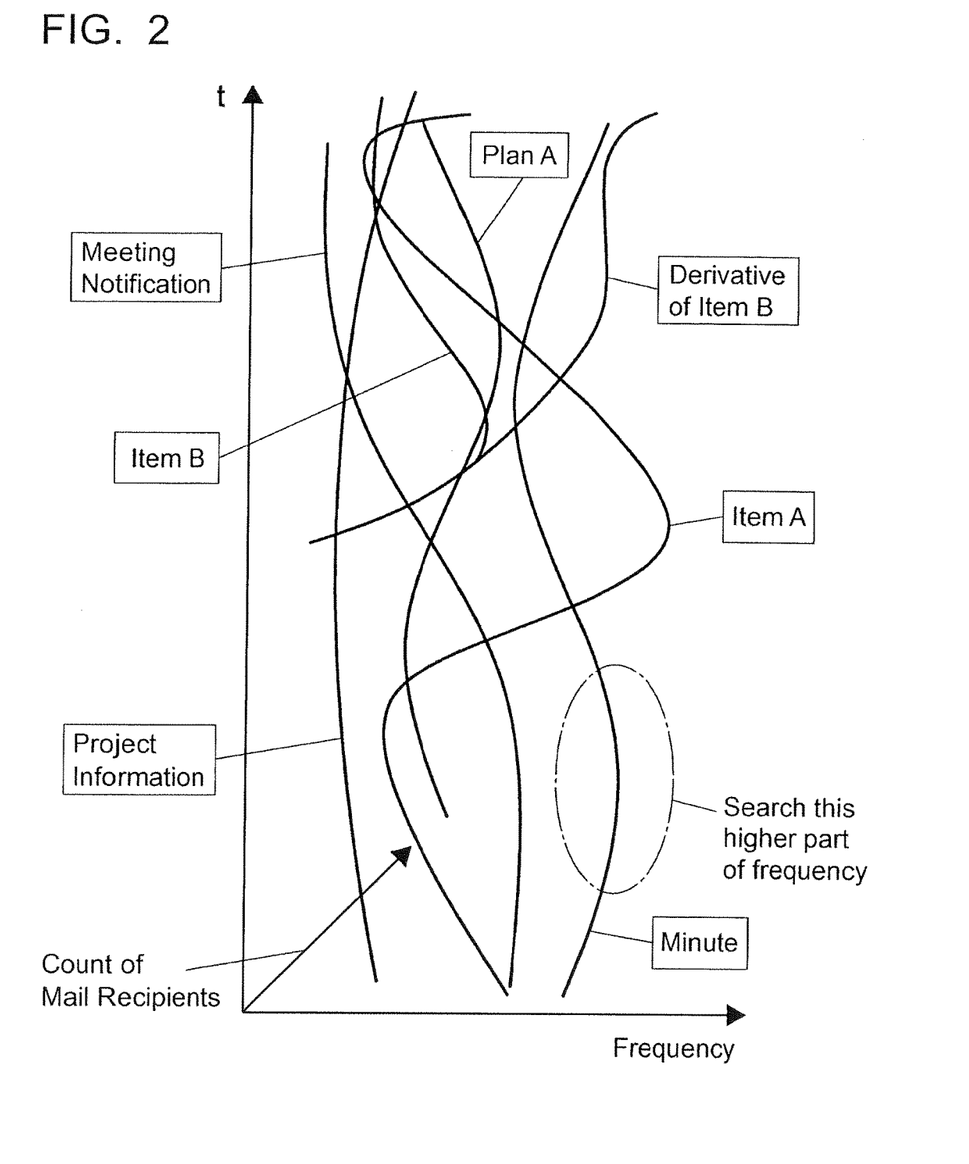
FIG. 2 illustrates a state of searching mail focusing on a higher part of the frequency of sending and receiving among the streams related to a specific subject.

For example, assuming that the user has a vague memory of which the time of sending and receiving the mail is "around the days when the project was approaching a critical phase and the mails were frequently sent and received" while the user does not remember the exact date and a keyword when the user search for the past e-mails. As illustrated in FIG. 2, focusing on a higher part of the frequency of sending and receiving among the streams related to a specific subject (such as "minute") to search the mail at a guess causes the appropriate mail be easily found.

Thus, in the disclosure, it is possible to search based on even the fuzzier criteria compared with the traditional search performed with specifying a sender, a recipient, a keyword, or similar item when searching the appropriate mail.

After finding the appropriate data, for example, where the data is an e-mail, the measures of using typical mail software to reply to or forward the mail may be taken.

In the above description, the graph is defined as a three-dimensional graph. However, it is not limited to the above configuration, and any other graph insofar as the user can easily distinguish the data, including such as a two-dimensional graph may be applicable.

Up to this point, the points of the disclosure have been described.

System Configuration

Figure 3:
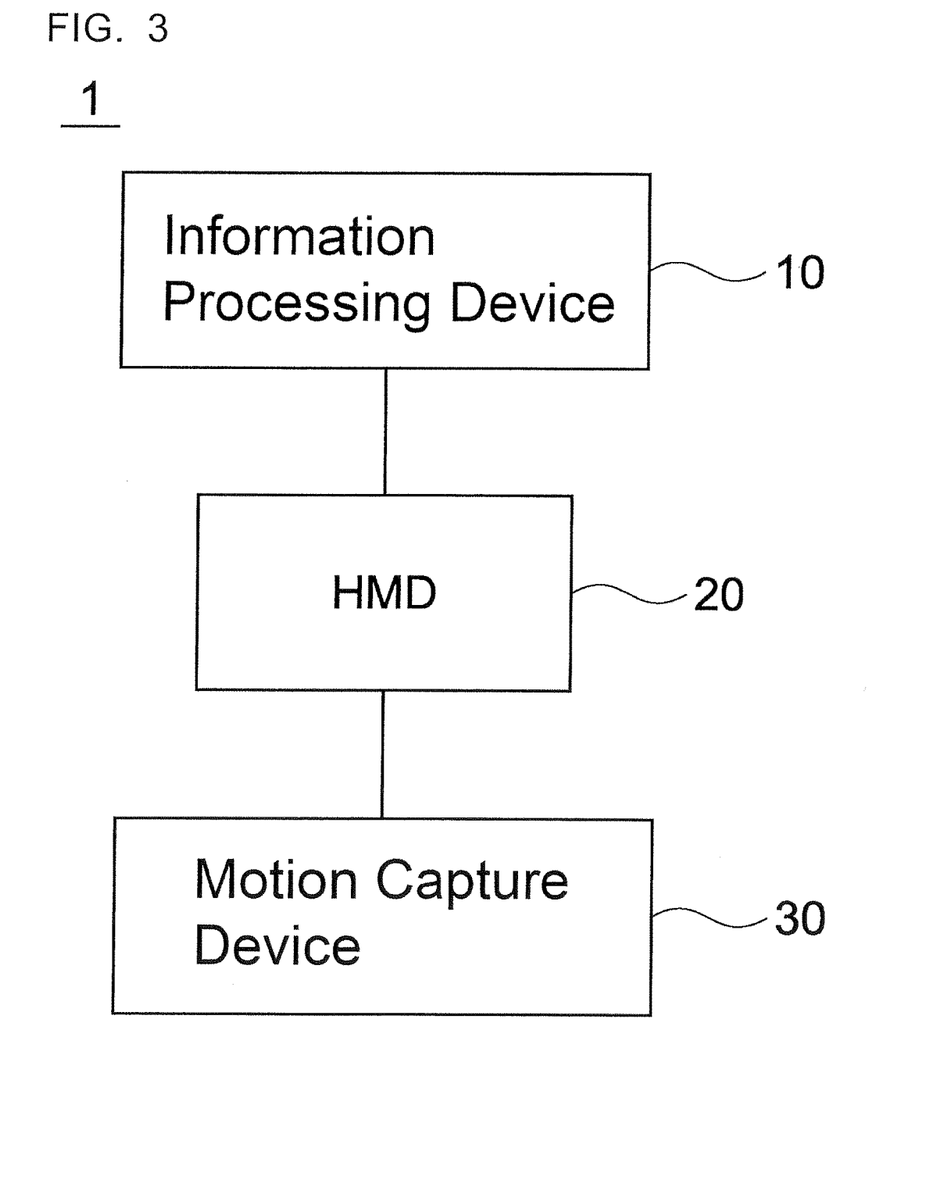
FIG. 3 illustrates a configuration of an information processing system including an information processing device according to an embodiment of the disclosure.

A configuration of an information processing system including the information processing device according to an embodiment of the disclosure will now be described. FIG. 3 illustrates a configuration of an information processing system 1 including an information processing device 10 according to an embodiment of the disclosure.

The information processing system 1 includes the information processing device 10, an HMD 20, and a motion capture device 30. The HMD 20 and the motion capture device 30 may be formed integrally.

The information processing device 10 stores the large amount of data of such as e-mails. The information processing device 10 generates the three-dimensional graph from the stored data depending on such as user's instruction to display it on the HMD 20.

The information processing device 10 changes a display of the three-dimensional graph displayed on the HMD 20 depending on a user's motion or gesture detected by the motion capture device 30. That is, the user is made to be able to have a sense of operation by directly touching a graph stereoscopically displayed in front of him or her with own hands and fingers, so as to implement a Natural User Interface. The information processing device 10 may specifically include a household appliance such as a Personal Computer (PC) or a television receiver.

The HMD 20 is a display of a glasses type or a helmet mounted type that is wearable on user's head, and an example of the display apparatus of the disclosure. The user may observe that the graph displayed in three dimensions and his or her own hands or fingers operating the graph are seemingly in an overlapped state, in order to implement a more natural NUI such that user operates by directly touching the three-dimensional graph displayed in front of him or her.

For this reason, the HMD 20 may employ not a non-see-through type, which a user is not able to see an external scene, but a video-see-through HMD, an optical see-through HMD, or similar HMD. The video-see-through HMD takes the external scene on a video camera mounted in the HMD 20 to display the captured external scene and the three-dimensional graph overlapping each other. The optical see-through HMD enables the user to see the external scene directly.

The motion capture device 30 is an example of the operation detecting device of the disclosure and detects an action and gesture of hand and finger which the user makes while looking the three-dimensional graph. That is, the motion capture device 30 may be capable of detecting an absolute position of hand and finger with the action and gesture made by the user. The motion capture device 30 transmits the detected gesture to the information processing device 10. As described above, the HMD 20 causes the user visually and stereoscopically to recognize the graph overlapped with his or her hand and finger. The motion capture device (operation detecting device) 30 can detect an absolute position of the user's hand and finger in an three-dimensional space, and the information processing device 10 may have a configuration communicating with the user by a Natural User Interface for the user having a sense of operation by directly touching a graph stereoscopically displayed.

In the above description, the information processing device 10, the HMD 20, and the motion capture device 30 are independent equipment, and are combined with each other to constitute the information processing system 1. However, it is not limited to this configuration, and the information processing device 10 may include the HMD 20 and the motion capture device 30.

It is not limited to the above configuration. The combination of a dynamic display technology that enables to put up an image of the three-dimensional graph in the air and a high speed 3D gesture recognition technology may cause the user have a sense as if the user actually touch the graph directly with his or her hand to operate in the three-dimensional space.

Up to this point, the configuration of the information processing system including the information processing device according to an embodiment of the disclosure has been described.

Configuration of Information Processing Device

Figure 4:
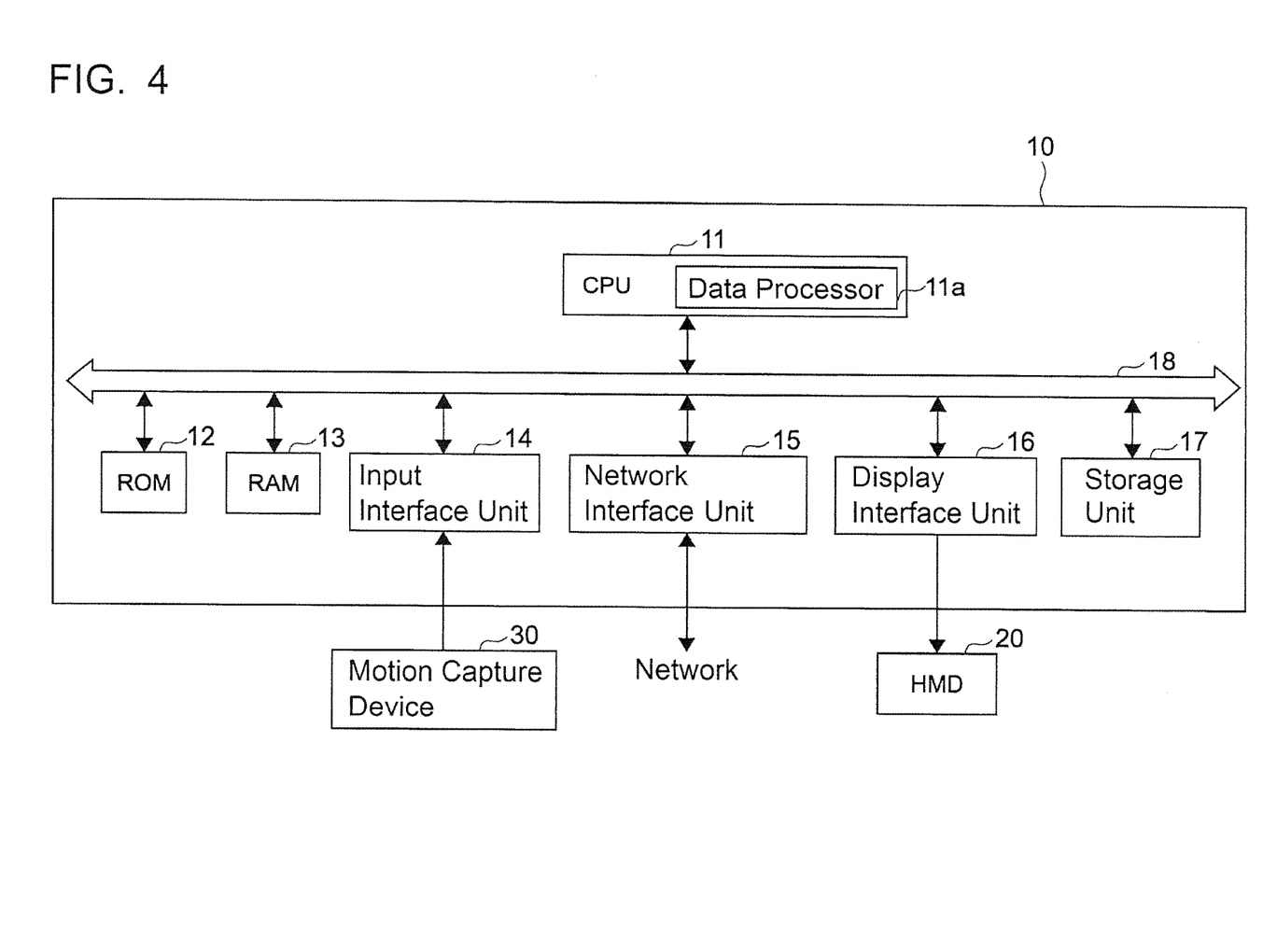
FIG. 4 illustrates a configuration where an information processing device according to the embodiment is constituted of a general-purpose computer.

A hardware configuration of the information processing device 10 will now be described. The information processing device 10 may be constituted of dedicated hardware and software and may be also constituted of general-purpose computers. FIG. 4 illustrates a configuration where the information processing device 10 is constituted of the general-purpose computers.

The information processing device 10 includes a Central Processing Unit (CPU) 11, a Read Only Memory (ROM) 12, a Random Access Memory (RAM) 13, an input interface unit 14, a network interface unit 15, a display interface unit 16, and a storage unit 17. These blocks are each connected via a bus 18.

The ROM 12 permanently stores a plurality of programs such as a firmware and data for performing the various processes. The RAM 13, which is used as a working area of the CPU 11, temporarily holds the Operating System (OS), various applications running on, and various data during processing.

The storage unit 17 is such as a Hard Disk Drive (HDD), a flash memory, or an additional non-volatile memory. The storage unit 17 is a circuit that stores the OS, the various applications, and the various data.

The network interface unit 15 is connected to a network for exchanging information with devices on the network.

The CPU 11 is a circuit that loads a program that corresponds to an instruction provided by the input interface unit 14 among the plurality of programs stored in the ROM 12 or the storage unit 17 into the RAM 13. Subsequently, the CPU 11 appropriately controls the display interface unit 16 and the storage unit 17 according to the loaded program.

The CPU 11 executes the program, so as to include a data processor 11a as a function block. The data processor 11a organizes the data to display the large amount of data stored in the storage unit 17 on the three-dimensional graph. The CPU 11 performs the process corresponding to the gesture accepted by the input interface unit 14.

The input interface unit 14 accepts the user's action and the gesture detected by the motion capture device 30.

The display interface unit 16 outputs the data for displaying the three-dimensional graph on the HMD 20.

Up to this point, the hardware configuration of the information processing device 10 has been described.

Example of Gesture and Display

An example of the gesture for which the user operates the three-dimensional graph displayed in front of him or her, and an example of the display changing in response to the gesture will now be described.

FIGS. 5 to 10 illustrate examples of the gesture for which the user operates a display of the three-dimensional graph, and examples of the three-dimensional graph changed by the specific gesture.

Figure 5:
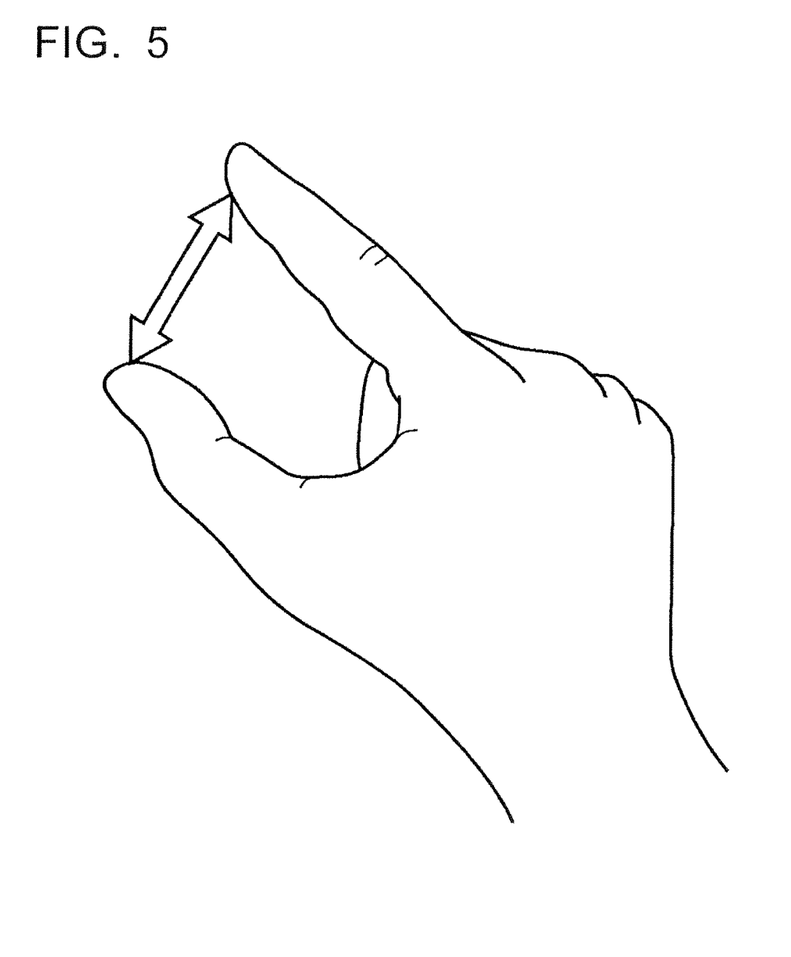
FIG. 5 illustrates a state where a user makes pinch-in and pinch-out zoom gestures.

As illustrated in FIG. 5, the user makes a pinch-in or pinch-out zoom gesture. This ensures that the data processor 11a of the information processing device 10 zooms in or zooms out a display area of the three-dimensional graph.

Figure 6:
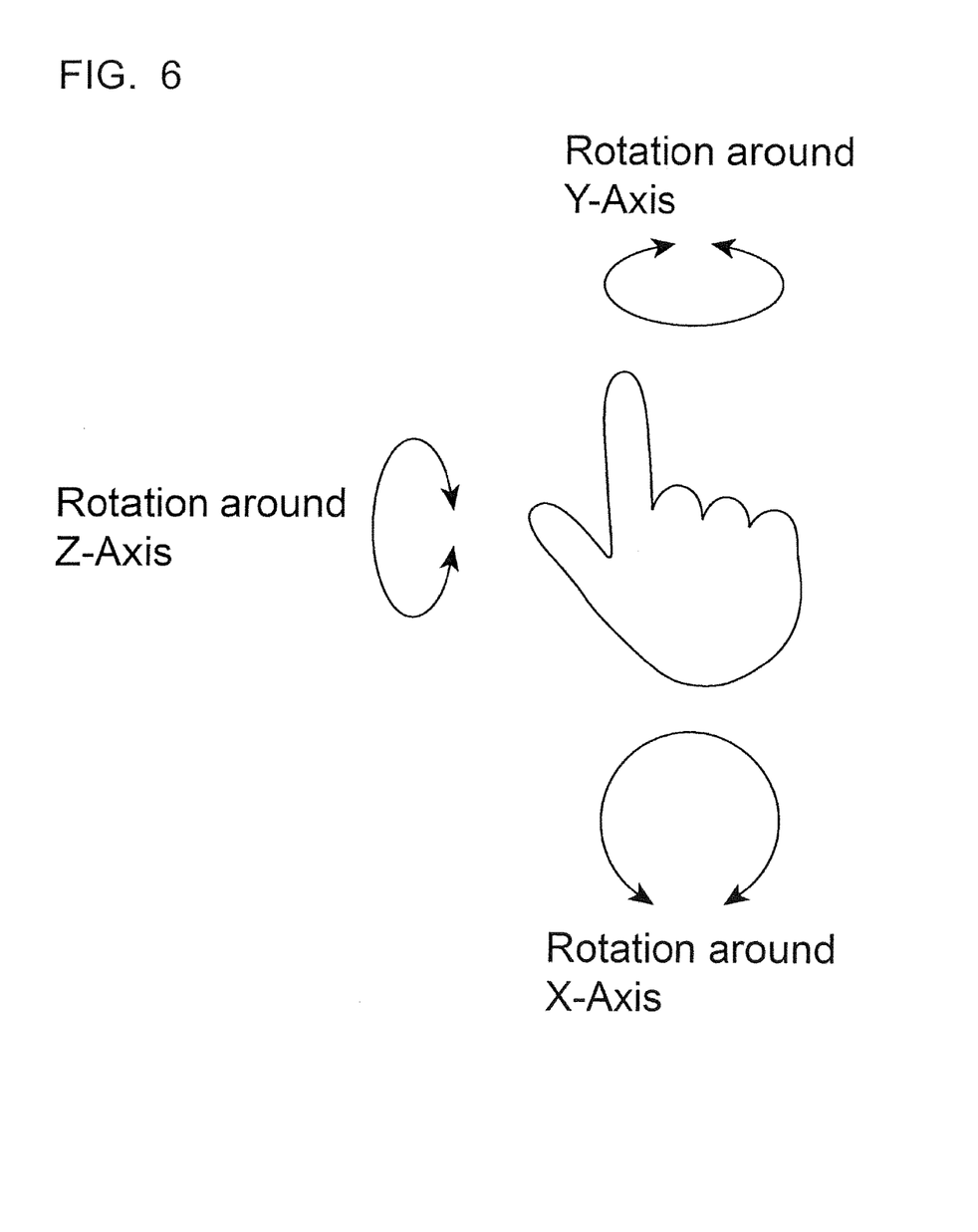
FIG. 6 illustrates a state where a user makes gestures of spinning his or her hand with a thumb and an index finger stretched around an X-, Y-, or Z-axis.

As illustrated in FIG. 6, the user makes gestures of spinning or twisting his or her hand with a thumb and an index finger stretched around an X-, Y-, or Z-axis. This ensures that the data processor 11a of the information processing device 10 rotates the three-dimensional graph around a specified axis.

Figure 7:
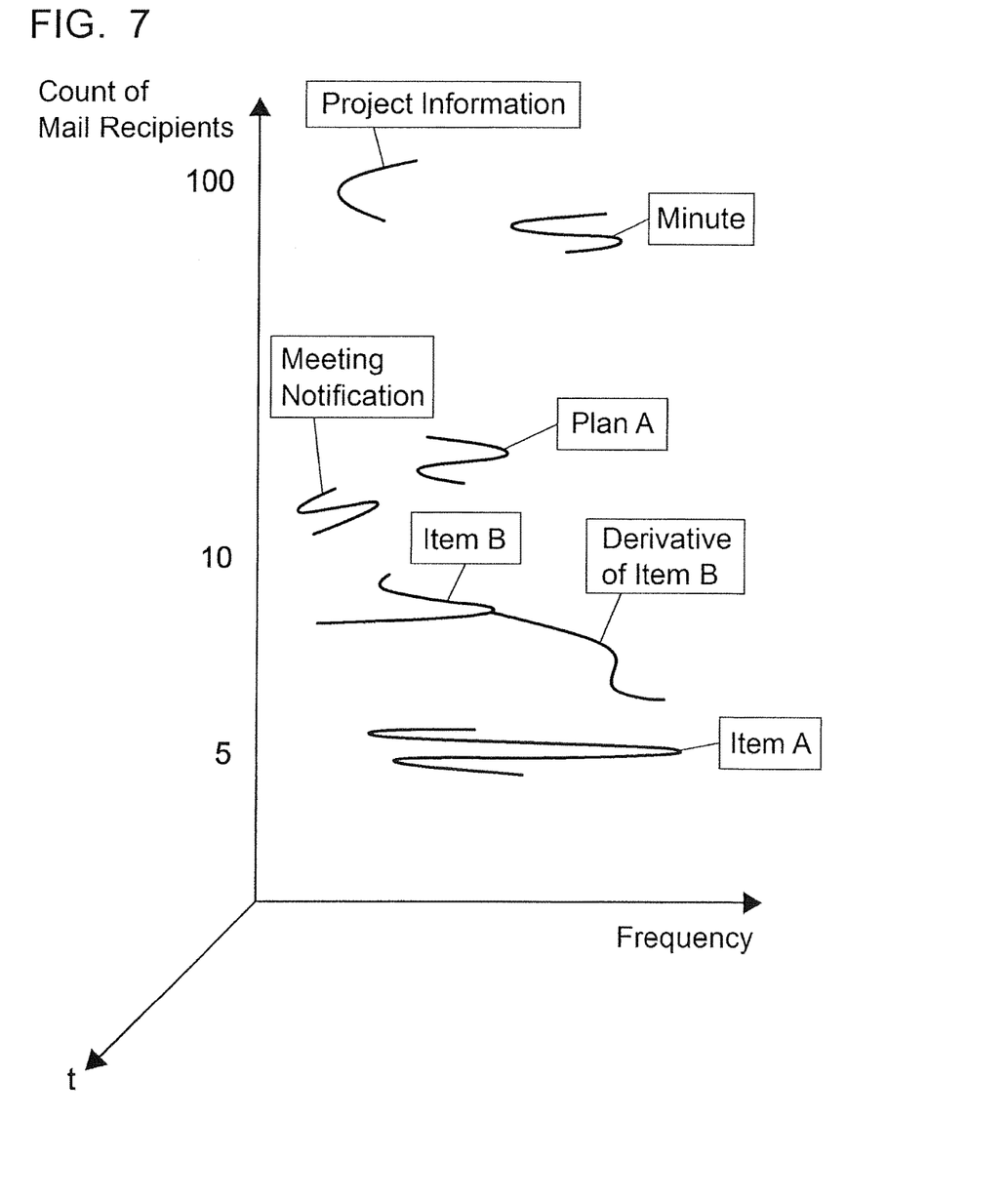
FIG. 7 illustrates a state of rotating a three-dimensional graph illustrated in FIG. 1 by 90 degrees around an axis of frequency.

FIG. 7 illustrates a state of rotating the three-dimensional graph illustrated in FIG. 1 by 90 degrees around an axis of frequency. The axis of the count of mail recipients is displayed in the foreground as illustrated in FIG. 7, so as to easily distinguish the streams covering around the respective a hundred, ten, and several mail recipients from one another.

Figure 8:
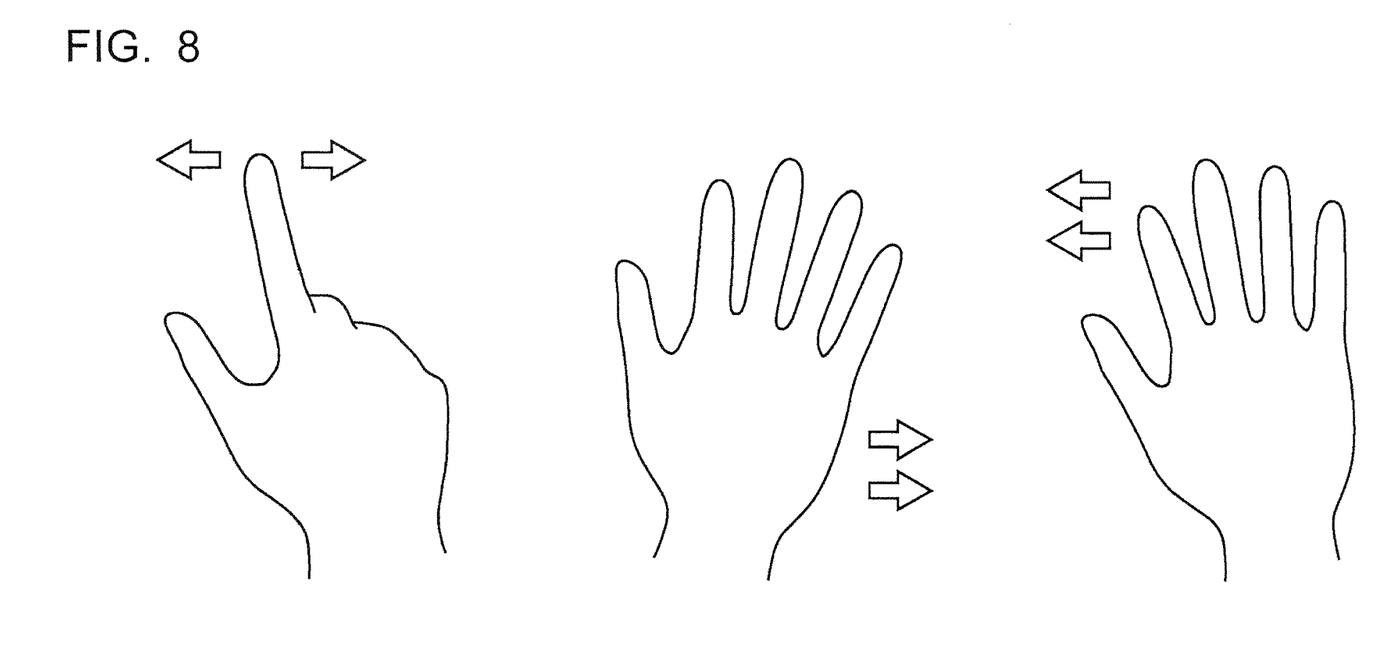
FIG. 8 illustrates a state where a user makes gestures of waving his or her hand parallel to an axis of a three-dimensional graph.

As illustrated in FIG. 8, the user makes gestures of waving his or her hand parallel to an axis of the three-dimensional graph. This ensures that the data processor 11a of the information processing device 10 identifies (or selects) the plurality of streams, which are aligned parallel to the axis of user waving his or her hand, as potential results to be searched in detail.

Figure 9:
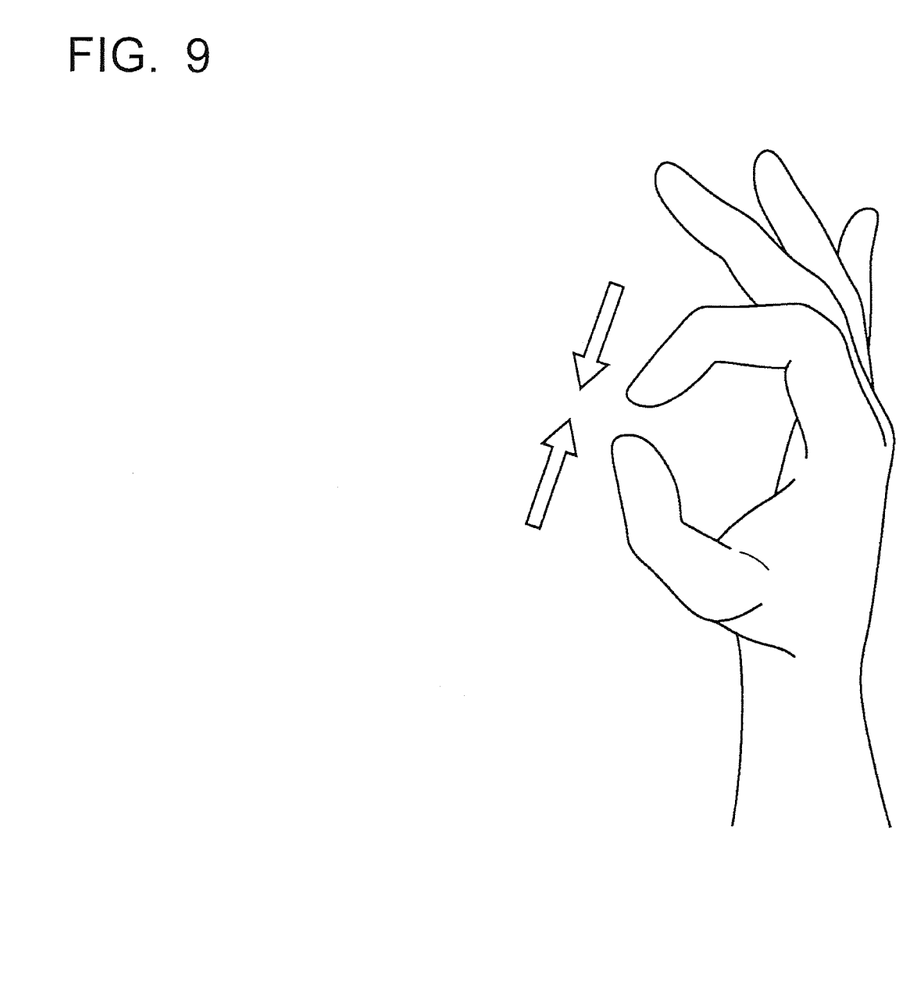
FIG. 9 illustrates a state where a user makes a gesture of pinching a specific part on a selected stream.

As illustrated in FIG. 9, the user makes a gesture of pinching a specific part on a selected stream. This ensures that the data processor 11a of the information processing device 10 identifies the data corresponding to a pinched position as well as identifies the stream corresponding to the pinched position as a target to be searched in detail.

Figure 10:
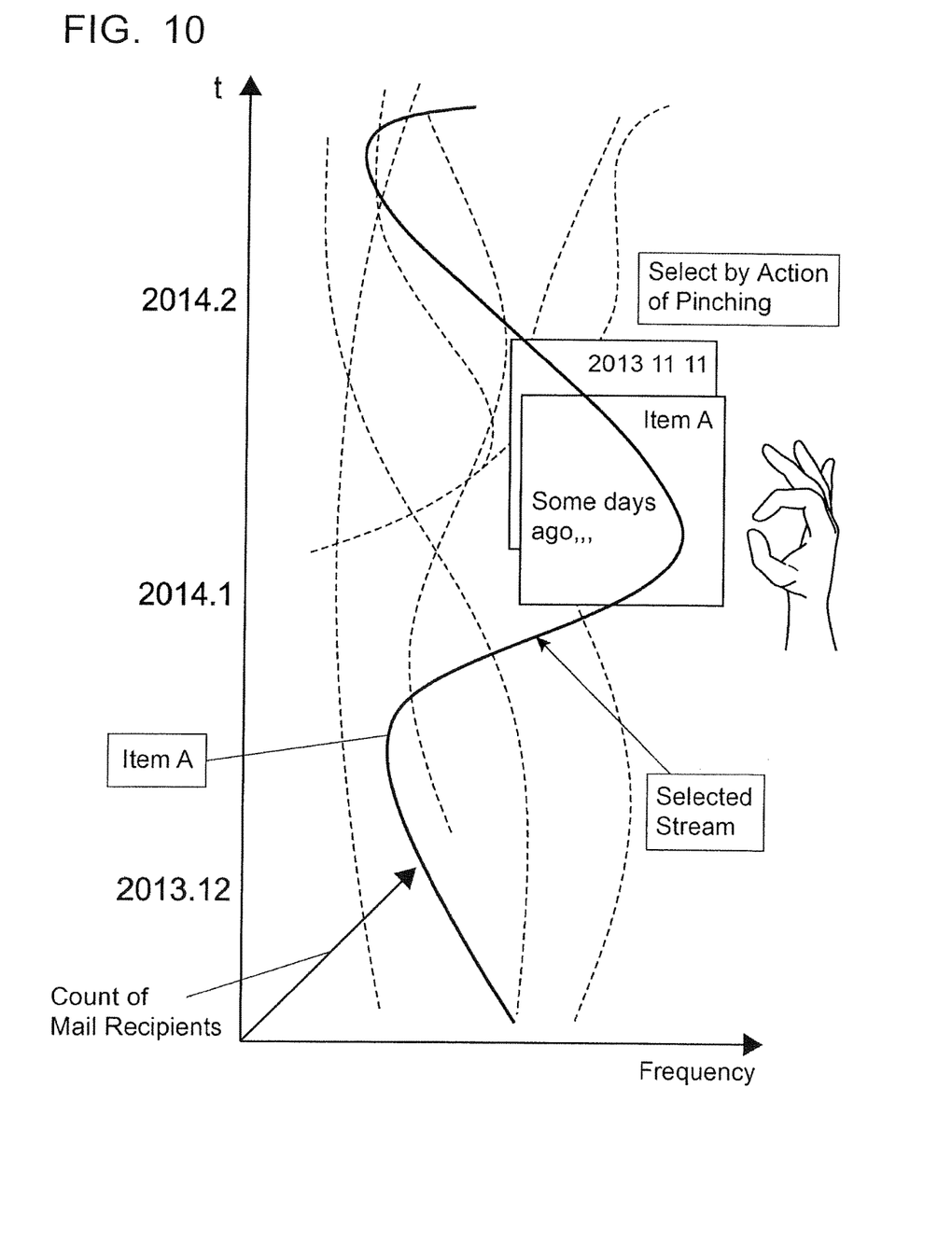
FIG. 10 illustrates an example where a data content (content of e-mail in this example) located in a pinched part is previewed adjacent to the pinched part when a user selects a stream with a subject of "item A" and then pinches a highest part of the frequency.

FIG. 10 illustrates an example where a data content (content of e-mail in this example) located in a pinched part is previewed adjacent to the pinched part when the user selects a stream with a subject of "item A" and then pinches a highest part of the frequency. As described above, the information processing device 10 can be configured "to select data on the line corresponding to a part pinched by the user," as well as "to display content of data adjacent to a part pinched by the user on the line corresponding to the part pinched by the user" by the user's making action of pinching the selected stream (line) detected by the motion capture device 30.

Multiple contents of the data adjacent to the part of the user attempting to pinch are previously displayed as preview images in the positions corresponding to the respective data. The user may select the appropriate data while the user looks these preview images.

Up to this point, the example of the gesture for which the user operates the three-dimensional graph displayed in front of him or her, and the example of the display changing in response to the gesture have been described.

Examples of Item used as Three Axes and Stream

Examples of capabilities to employ as items of three axes and the stream of the graph when representing a large amount of data in the three-dimensional graph will now be described. The large amount of data has a plurality of attributes, and can be searched by a computer.

For example, where the large amount of data is for browsing log of a browser, time of browsing, a Web site rank, and frequency of visiting the site may be plotted on three axes to employ the browsing log for one of one tab and one site, as the stream.

For example, where the large amount of data is music data, three entries among release date of the music, a hit level, a user evaluation, and a category may be employed as the items of the axes to employ such as an artist name, the category, and top ten records in hit chart, as the stream. Note that the category cannot be employed for the stream when employing the category for the axis.

For example, where the large amount of data is for a document, time of creating and modifying document, frequency of updating document, and a category may be plotted on three axes to employ one of an author name, a group name of such as a folder, and a document type, as the stream.

For example, where the large amount of data is for a recorded video, three entries among time of video recording, a hit level of the recorded program, an evaluation, and a category may be employed for the axes to employ the program name or the category as the stream.

For example, the large amount of data is for a product of an Internet shopping site, three entries among time of a product shown on the site, a hit level of the product, an evaluation, a category may be employed for the axes to employ one of a brand name and a series title of the product, or the category, as the stream.

For example, where the large amount of data is for a photograph, time of the photograph taken, frequency of taking a photograph, and an evaluation of the photograph may be plotted on three axes to employ a name of the person in the photograph, a location in the photograph (including such as location information provided by GPS), a name of album created by a user, or similar item, as the stream.

The examples of capabilities to employ as the items of three axes and the stream of the graph when representing the large amount of data in the three-dimensional graph have been described above.

As described above, the embodiment employs a Natural User Interface to organize and clearly present mass data to user and ensures the user to operate intuitively.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information processing system, comprising:
an information processing device;
a display apparatus; and
an operation detecting device,
wherein the information processing device includes a storage circuit that stores a plurality of pieces of data having four types of attributes indicating a subject of an e-mail, time of sending and receiving of the e-mail, frequency of sending and receiving of the e-mail, and a count of e-mail recipients, and a control circuit,
wherein the control circuit that:
allocates the time of sending and receiving of the e-mail, the frequency of sending and receiving of the e-mail, and the count of e-mail recipients as three mutually different attributes to respective axes of a three-dimensional space;
generates a graph plotting the plurality pieces of stored data of the e-mail on the three-dimensional space as respective points corresponding to the plurality pieces of data;
classifies the plurality pieces of plotted data into groups using an attribute indicating the subject of the e-mail of the four types of attributes; and
processes the plurality of points so as to be identified by the group by generating a line having the point representing data included in the group, wherein the processing includes linking the plotted data with the curved line per-thread based on the subject of the e-mail to represent the stream,
wherein the display apparatus displays the graph processed by the control circuit,
the operation detecting device detects an action performed by a user by detecting an absolute position of the user's hand and finger in the three-dimensional space,
the control circuit moves, rotates, zooms in, and zooms out the graph displayed on the display apparatus depending on the user's action detected by the operation detecting device, and
the control circuit displays, on the display apparatus, contents of the data adjacent to a part that the user is attempting to pinch, as preview images in the positions corresponding to the respective data.

2. The information processing system according to claim 1,
wherein the display apparatus causes the user visually and stereoscopically to recognize the graph overlapped with his or her hand and finger,
the control circuit communicates with the user by a Natural User Interface for the user having a sense of operation by directly touching the stereoscopically displayed graph.

3. The information processing system according to claim 1,
wherein the control circuit selects the line of a user's operation target by the user's making action of waving his or her hand to the axis direction detected by the operation detecting device.

4. The information processing system according to claim 1,
wherein the control circuit selects data on the line corresponding to the part pinched by the user by the user's making action of pinching the line detected by the operation detecting device.

5. The information processing system according to claim 1,
wherein the control circuit displays content of data adjacent to a part pinched by the user on the line, the data corresponding to the part pinched by the user by the user's making action of pinching the line detected by the operation detecting device.

6. The information processing system according to claim 1,
wherein the plurality pieces of data include the e-mail,
the three different attributes include time of sending and receiving the e-mail, frequency of sending and receiving the e-mail per unit time, and a recipient of the e-mail, and
the other one attribute is a title of the e-mail.

7. An information processing method using an information processing device that includes a storage circuit that stores a plurality of pieces of data having four types of attributes indicating a subject of an e-mail, time of sending and receiving of the e-mail, frequency of sending and receiving of the e-mail, and a count of e-mail recipients, the method comprising:
allocating the time of sending and receiving of the e-mail, the frequency of sending and receiving of the e-mail, and the count of e-mail recipients as three mutually different attributes of four types of attributes stored in the storage circuit, to respective axes of a three-dimensional space;
generating a graph plotting the plurality pieces of stored data of the e-mail on the three-dimensional space as respective points corresponding to the plurality pieces of data;
classifying the plurality pieces of plotted data into groups using an attribute indicating the subject of the e-mail of the four types of attributes;
processing the plurality of points so as to be identified by the group by generating a line having the point representing data included in the group, wherein the processing includes linking the plotted data with a curved line per-thread based on the subject of the e-mail to represent the stream;
displaying the processed graph on a display apparatus;
detecting an action performed by a user by detecting an absolute position of the user's hand and finger in the three-dimensional space by an operation detecting device;
moving, rotating, zooming in, and zooming out the graph displayed on the display apparatus depending on the user's action detected by the operation detecting device; and
displaying, on the display apparatus, contents of the data adjacent to a part that the user is attempting to pinch, as preview images in the positions corresponding to the respective data.

8. A non-transitory computer-readable recording medium storing an information processing program to control an information processing system, the information processing program causing the information processing system as:
an information processing device;
a display apparatus; and
an operation detecting device,
wherein the information processing device includes a storage circuit that stores a plurality of pieces of data having four types of attributes indicating a subject of an e-mail, time of sending and receiving of the e-mail, frequency of sending and receiving of the e-mail, and a count of e-mail recipients, and a control circuit,
wherein the control circuit that:
allocates the time sending and receiving of the e-mail, the frequency of sending and receiving of the e-mail, and the count of e-mail recipients as three mutually different attributes to respective axes of a three-dimensional space;
generates a graph plotting the plurality pieces of stored data of the e-mail on the three-dimensional space as respective points corresponding to the plurality pieces of data;
classifies the plurality pieces of plotted data into groups using an attribute indicating the subject of the e-mail of the four type of attributes; and
processes the plurality of points so as to be identified by the group by generating a line having the point representing data included in the group, wherein the processing includes linking the plotted data with a curved line per-thread abased on the subject of the e-mail to represent the stream,
wherein the display apparatus displays the graph processed by the control circuit,
the operation detecting device detects an action performed by a user by detecting an absolute position of the user's hand and finger in the three-dimensional space,
the control circuit moves, rotates, zooms in, and zooms out the graph displayed on the display apparatus depending on the user's action detected by the operation detecting device, and
the control circuit display, on the display apparatus, contents of the data adjacent to a part that the user is attempting to pinch, as preview images in the positions corresponding to the respective data.

* * * * *